F. J. SCHROEDER.
THIRD POINT SUSPENSION CLIP.
APPLICATION FILED NOV 15, 1915.
1,193,929.
Patented Aug. 8, 1916.
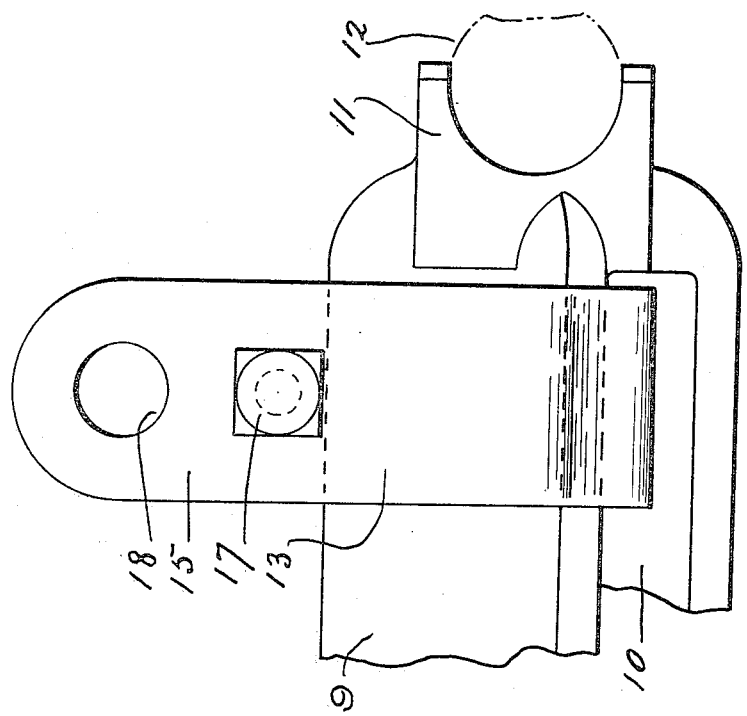
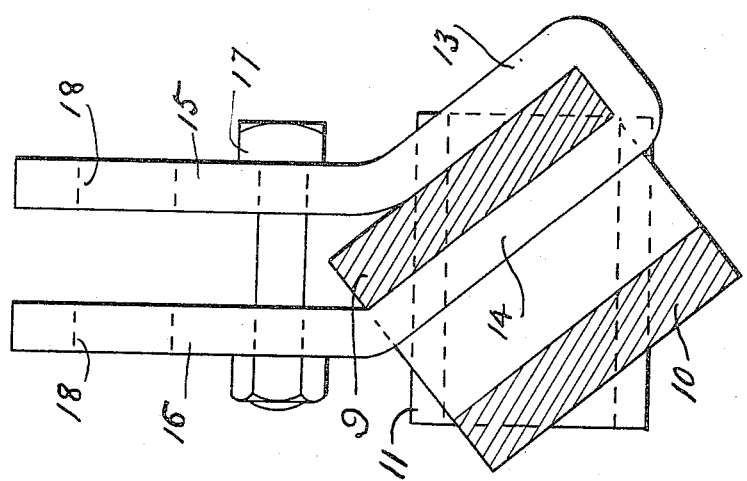
WITNESS
Herman Jakobsson
INVENTOR,
Frederick J. Schroeder
Knight Bro.
Attorneys.

UNITED STATES PATENT OFFICE.

FREDERICK J. SCHROEDER, OF CLEVELAND, OHIO, ASSIGNOR, BY MESNE ASSIGNMENTS, TO THE DAMASCUS BRAKE BEAM COMPANY, OF CLEVELAND, OHIO, A CORPORATION OF OHIO, (INCORPORATED FEBRUARY 25, 1916.)

THIRD-POINT SUSPENSION-CLIP.

1,193,929.  Specification of Letters Patent.  Patented Aug. 8, 1916.

Application filed November 15, 1915. Serial No. 61,659.

*To all whom it may concern:*

Be it known that I, FREDERICK J. SCHROEDER, a citizen of the United States, residing at Cleveland, in the county of Cuyahoga and State of Ohio, have invented certain new and useful Improvements in Third-Point Suspension-Clips, of which the following is a specification.

The present invention relates to third point suspension hangers for trussed brake beams, and the object of the invention is to provide such suspension hangers for use on existing brake beams, without the requirement of any special construction of the strut or the tension member bearing, not even as much as the drilling of a single hole therein.

It has been customary when a third point hanger is required, to provide an eyelet on the solid metal of the brake fulcrum right from the start. This is generally the case when the fulcrums are made of cast material. In many cases, fulcrums which are not provided with such an eyelet from the beginning, are afterward supplied with a third point suspension hanger, either a forging or a casting, which is riveted or bolted to the brake beam fulcrum. This requires some fitting of the brake beam which necessitates the removal thereof to perform the machining. This is entirely unnecessary with applicant's hanger, which can be attached to the brake beam without any preliminary fitting, and without removing the beam from the car.

In the accompanying drawing, one embodiment of the invention has been illustrated.

Figure 1 shows a side elevation of the attachable third point suspension clip with the appurtenant part of a brake beam and Fig. 2, an end view, partly in section of Fig. 1, seen from the left.

The fulcrum of the brake beam here represented is provided with the usual two arms 9 and 10 of rectangular cross section, the arms being connected by the solid seat 11 for the tension member 12 of the brake beam.

The clip or hanger in this case is preferably made of a flat double bent band, the distance between the two shanks 13 and 14 being approximately equal to the thickness of the fulcrum arm 9. As the arms 13 and 14 stand at an angle against the horizontal when in position, the outer ends 15 and 16 of the hanger have to be bent relatively to the fulcrum embracing shanks 13, 14, in order to become perpendicular. It is advantageous to let the center of gravity of the fulcrum or indeed, of the entire brake beam fall in the central vertical plane between the two ends 15, 16 of the hanger, when the brake beam is in position. After the clip has been slipped over the upper one 9 of the two fulcrum arms, it is clamped or rigidly secured thereon by means of a bolt 17 through the ends 15, 16. It will be observed that this bolt does not touch, much less penetrate, any part of the brake fulcrum. The ends 15, 16 are lastly provided with alined holes 18 for a pin or bolt to connect the hanger with the suspension rod.

From the foregoing, it will be evident that this third point suspension clip may be attached with great facility to existing brake beams of different construction without any preliminary preparation of the beam or without its removal from the car on which it is carried.

I claim:—

1. A third point suspension clip for brake beams having a gripping portion and a suspension portion, the gripping portion being constructed to embrace a part of the brake beam, and means on the suspension portion and exteriorly to the brake beam for tightening said gripping portion around the brake beam, said suspension portion being provided with eyelets for attaching the hanger to a suspension rod.

2. A third point suspension clip for brake beams, comprising a double bent band having a gripping portion and a suspension portion, the gripping portion being constructed to embrace a part of the brake beam, and means on the suspension portion for tightening said gripping portion around the brake beam, said suspension portion being provided with eyelets for attaching the hanger to a suspension rod.

3. A third point suspension clip for brake beams, comprising a double bent band, the free ends of the band forming a suspension portion and the connected part thereof forming a gripping portion embracing the brake beam, and means on the suspension portion for tightening said gripping portion around the brake beam.

4. A third point suspension clip for brake beams, comprising a double bent band, the free ends of the band forming a suspension portion and the connected part thereof forming a gripping portion embracing the brake beam, and means on the suspension portion for tightening said gripping portion around the brake beam, said gripping portion being offset relatively to said suspension portion an amount equal to the angularity of the brake beam against the perpendicular when the beam is in operating position.

5. A third point suspension clip for brake beams, comprising a double bent band, the free ends of the band forming a suspension portion and the connected part thereof forming a gripping portion embracing the brake beam, and means on the suspension portion for tightening said gripping portion around the brake beam, said gripping portion being offset relatively to said suspension portion, in order to bring the center of gravity of the brake beam into the central vertical plane between the two ends of the suspension portion, when the beam is in operating position.

The foregoing specification signed at Cleveland, Ohio, this 11th day of August, 1915.

FREDERICK J. SCHROEDER.

Copies of this patent may be obtained for five cents each, by addressing the "Commissioner of Patents, Washington, D. C."